United States Patent Office 3,387,965
Patented June 11, 1968

3,387,965
SOIL STABILIZER COMPOSITION AND METHOD OF MAKING FROM SPENT SULFITE LIQUORS
Shigeo Kiyooka and Jiro Okabe, Iwakuni-shi, Japan, assignors to Sanyo Pulp Company, Limited, Tokyo, Japan, a corporation of Japan
No Drawing. Filed Apr. 21, 1965, Ser. No. 449,860
Claims priority, application Japan, May 12, 1964, 39/26,559
5 Claims. (Cl. 71—25)

ABSTRACT OF THE DISCLOSURE

A soil stabilizer consisting of a modified sulfite pulp waste liquor containing a chlorinated lignosulfonic acid, a hexavalent chromium compound, and a water-soluble metallic salt selected from the group consisting of divalent or trivalent metallic salts of iron, aluminum, copper and manganese, and having a remarkably shortened gelling time and an increased gel strength, when compared with a soil stabilizer obtained from an ordinary sulfite waste liquor.

---

This invention relates to soil stabilizer compositions. More particularly this invention relates to soil stabilizers of chrome-lignin type having remarkable soil stabilizing effect and obtained by treating spent liquor from sulfite pulp manufacture with chlorine in advance and adding thereto hexa-valent chromium salt alone or together with water-soluble salt of di- or tri-valent metal.

There have been heretofore many methods proposed for stabilizing soil. It has been also known that spent liquor from sulfite pulp manufacture is made insoluble by adding bichromate salt and used for stabilizing soil in the name of so-called chrome-lignin process. In such a case, it has been also known that ion of metal such as iron, aluminum and copper increases the stabilizing effect. It has been also known that soil stabilization by the chrome-lignin process shows effect superior to that by soil cement method in the treatment for soil such as organovolcanic ash soils. However since in very one of these methods being used a large amount of expensive hexavalent chromium salt, for example sodium bichromate, they have drawback in the point of cost.

An object of the present invention is, accordingly, to provide soil stabilizer compositions which are not expensive but possess superior soil stabilizing effect.

After fully investigating the mechanism of spent liquor from sulfite pulp manufacture being turned insoluble by hexa-valent chromium salt, the inventors of the present invention found that the kind of spent liquor and various pretreatments given to this spent liquor such as oxidation with air, oxidation with nitric acid, condensation, and chlorine treatment, have important relation with insolubilification and that the chlorine treatment among these is extremely effective for promoting insolubility.

Based upon these observations, the present inventors discovered that soil stabilizers which possess superior soil stabilizing effect and dispense with the use of expensive bichromate by about 20 to 30 percent, are produced by treating spent liquor from sulfite pulp manufacture with chlorine, and they further discovered that soil stabilizers of chrome-lignin type possessing excellent soil stabilizing effect are produced by incorporating bichromate and a water-soluble salt of di- or tri-valent metal in chlorinated spent liquor from sulfite pulp manufacture.

According to the present invention, chlorine gas is introduced into spent liquor from sulfite pulp manufacture or concentrated liquor thereof at room temperature or under heating until the pH reaches 0.5 to 4.0. Therefore, a hexavalent chromium salt e.g. sodium bichromate is added directly to the resulting chlorine-treated liquor or to the substance obtained by drying (e.g. spray drying) the above-mentioned chlorine-treated liquor to produce soil stabilizers. Alternatively a water-soluble salt of di- or tri-valent metal is mixed with the liquor obtained by the above-mentioned procedure. It is also possible to produce soil stabilizers by mixing a water soluble salt of di- or tri-valent metal with sodium bichromate in advance and then adding this mixture directly to the above-mentioned chlorine-treated liquor or to the substance obtained by drying the above-mentioned chlorine-treated liquor. Alternatively, it is also possible to produce soil stabilizers by mixing a water-soluble salt of di- or tri-valent metal with the above-mentioned chlorine-treated liquor and thereafter sodium bichromate is added directly to the resulting mixed liquor or to the substance obtained by drying the mixed liquor.

Representative water soluble salts of di- and tri-valent metals include metal chlorides such as $CuCl_2$, $MnCl_2$, and $AlCl_3$ and metal sulfates such as $CuSO_4$, $MnSO_4$, $FeSO_4$, and $Al_2(SO_4)_3$.

As spent liquor from sulfite pulp manufacture, those which are produced from broad-leaved trees (latifoliate trees) as the raw materials or those from needle-leaf trees (coniferous trees) are both useful but the latter is particularly suitable. It is preferable to use the fermented liquor from the latter.

It is possible to reduce the pH value in the reaction system with smaller amounts of chlorine when the temperature is elevated (70°–80° C.) during the chlorine treatment as compared to addition at room temperature. Generally speaking, the absorption amount of chlorine per unit of solid matter in spent liquor is preferably in the neighborhood of 6 percent. In this instance the chlorine content of lignin sulfonic acid is in the range of 1.7 to 2.0 percent. It is necessary to give attention so as not to add an excessive amount of chlorine since it causes oxidative degradation of lignin sulfonic acid which is harmful to the insolubilification in the next step. The optimum end point pH after chlorine treatment is 2.0 in the case of fermented spent liquor from needle-leaf trees. When spent liquor having low pH is used, it is preferable to neutralize until the pH reaches about 5 before chlorine treatment. Since the absorption of chlorine into spent liquor is carried out easily, there will be hardly any loss in such chlorine treatment.

As for the mixing method of the soil stabilizers of the present invention, these include the surface-layer-sprinkling method, admixing method, grouting method and the like in the case of a solution, and simple mixing in the case of powder. Any of these methods is useful. The mixing amounts of water-soluble salt of di- or tri-valent metal and chromium salts to the chlorination-modified lignin liquor can be varied according to the required strength of the soil and the allowable time (required) to be insoluble, and they are determined by the strength of gel and required gelation time shown in the following exemplary experiment.

EXEMPLARY EXPERIMENT (1) Definition of abbreviations of terms used in the experiment:

$A_1$. Modified lignin liquor: Modified lignin liquor (containing 40 percent solid matter) obtained by introducing chlorine gas into spent liquor from sulfite pulp manufacture (pH 5) at room temperature until the pH reaches 2.

$A_2$. Modified lignin liquor: Modified lignin liquor (containing 40 percent solid matter) obtained by introducing chlorine gas into fermented sulfite pulp spent liquor.

$A_3$. Modified lignin powder: Modified lignin powder obtained by spray-drying $A_2$ down to 5 percent moisture.

$A_4$. Non-modified lignin liquor: Fermented (residue from) sulfite pulp spent liquor. (pH 5 and solid matter 40 percent.)

B. 40 percent sodium bichromate solution.

C. Water-soluble salt of di- or tri-valent metal: Chloride was used as 40 percent solution and sulfate and nitrate were used as crystal.

(2) Method for determining gelation time:

A, B, water and C were mixed each in amounts predetermined for the experiments. One hundred milliliters of this mixed solution were charged in a glass vessel of 50 mm. diameter and 60 mm. height and held in a 20° C. thermostat. The mixture commenced to gelate after a while. The time required for the mixture to reach the state at which it did not fall even when the vessel was turned upside down, was measured.

(3) Method for determining gel strength:

A, B, water and C were mixed each in amounts predetermined for the experiments. One hundred milliliters of this mixed solution were charged in a glass vessel of 50 mm. diameter and 60 mm. height and left at a temperature of 20° C. for 24 hours for gelation. With use of an unconfined compression apparatus, an iron cylinder of 45 mm. diameter was inserted in the gelated mixture and the gel pressures were calculated at 10 mm. penetration intervals.

Table 1 indicates the experimental results of required gelation time and gel strength obtained by adding various amounts of C to a definite amount of B.

As is evident from the comparison of experimental results between No. 1-1 or No. 1-2 and No. 1-11 in Table 1, the result of No. 1-11 is better, showing the superiority of the use of the modified lignin liquor. From the comparison of experimental results between No. 1-3 to No. 1-10 and No. 1-12 to No. 1-19, it is seen that the addition of the same amounts of C gives superior result in the combination with $A_1$ than in the combination with $A_4$.

The experimental results carried out for the saving of B by the addition of C is shown in Table 2.

TABLE 2

| Experiment No. | Mixing ratio (parts by weight) | | | | | Required gelation time (min.) | Gel strength K-value (kg./cm.³) |
|---|---|---|---|---|---|---|---|
| | A | pH of A | B | C | Water | | |
| 2-1 | $A_4$ 100 | ¹2.0 | 10 | $AlCl_3$ 3 | 100 | 650 | 7.3 |
| 2-2 | $A_4$ 100 | ¹2.0 | 20 | $AlCl_3$ 3 | 100 | 128 | 13.9 |
| 2-3 | $A_4$ 100 | ¹2.0 | 30 | $AlCl_3$ 3 | 100 | 93 | 16.1 |
| 2-4 | $A_1$ 100 | 2.0 | 10 | | 100 | 247 | 11.3 |
| 2-5 | $A_1$ 100 | 2.0 | 20 | | 100 | 102 | 14.5 |
| 2-6 | $A_1$ 100 | 2.0 | 30 | | 100 | 58 | 16.4 |
| 2-7 | $A_1$ 100 | 2.0 | 10 | $AlCl_3$ 3 | 100 | 129 | 12.7 |
| 2-8 | $A_1$ 100 | 2.0 | 15 | $AlCl_3$ 3 | 100 | 59 | 15.9 |
| 2-9 | $A_1$ 100 | 2.0 | 20 | $AlCl_3$ 3 | 100 | 47 | 17.6 |
| 2-10 | $A_1$ 100 | 2.0 | 25 | $AlCl_3$ 3 | 100 | 36 | 17.9 |
| 2-11 | $A_1$ 100 | 2.0 | 10 | $FeSO_4 \cdot 7H_2O$ 3 | 100 | 150 | 11.8 |
| 2-12 | $A_1$ 100 | 2.0 | 15 | $FeSO_4 \cdot 7H_2O$ 3 | 100 | 105 | 14.7 |
| 2-13 | $A_1$ 100 | 2.0 | 20 | $FeSO_4 \cdot 7H_2O$ 3 | 100 | 97 | 15.7 |
| 2-14 | $A_1$ 100 | 2.0 | 25 | $FeSO_4 \cdot 7H_2O$ 3 | 100 | 83 | 16.1 |

¹ Controlled by HCl.

(1) As is evident from the comparison of experimental results between No. 2-1 to No. 2-3, and No. 2-4 to No. 2-6, $A_1$, even without being mixed with C, requires a gelation time shorter than $A_4$ mixed with C. The gel strength is also higher in the former. This shows that $A_1$ enables to save B as compared to $A_4$.

(2) From the comparison of experimental results between No. 2-4 to No. 2-6, No. 2-7 to No. 2-10 and No. 2-11 to No. 2-14, and comparing the points having the same values of required gelation time and gel strength, it is seen that the addition of C enables to save B. Experimental results for the order of addition of B or C to A are shown in Table 3.

Note: In Experiment No. 3-1, B was added to A and then C was added thereupon. In Experiment No. 3-2, C was added to A and then B was added thereupon. In Experiment No. 3-3, B was mixed with C at first and A was added thereafter.

TABLE 3

| Experiment No. | Mixing ratio (by weight) | | | | | Required gelation time (min.) | Gel strength K-value (kg./cm.³) |
|---|---|---|---|---|---|---|---|
| | $A_1$ | pH of $A_1$ | B | C | Water | | |
| 3-1 | 100 | 2.0 | 20 | $AlCl_3$ 3 | 100 | 47 | 17.6 |
| 3-2 | 100 | 2.0 | 20 | $AlCl_3$ 3 | 100 | 50 | 17.3 |
| 3-3 | 100 | 2.0 | 20 | $AlCl_3$ 3 | 100 | 46 | 17.5 |

TABLE 1

| Experiment No. | Mixing ratio (by weight) | | | | | | Required gelation time (min.) | Gel strength K-value (kg./cm.³) |
|---|---|---|---|---|---|---|---|---|
| | $A_1$ | $A_4$ | pH of $A_1$ or $A_4$ | B | C | Water | | |
| 1-1 | | 100 | 5.0 | 20 | | 100 | 720 | 6.5 |
| 1-2 | | 100 | ¹2.0 | 20 | | 100 | 210 | 12.1 |
| 1-3 | | 100 | ¹2.0 | 20 | $AlCl_3$ 3 | 100 | 128 | 13.9 |
| 1-4 | | 100 | ¹2.0 | 20 | $FeCl_3$ 3 | 100 | 133 | 14.1 |
| 1-5 | | 100 | ¹2.0 | 20 | $CuCl_2$ 3 | 100 | 180 | 15.3 |
| 1-6 | | 100 | ¹2.0 | 20 | $MnCl_2$ 3 | 100 | 85 | 16.0 |
| 1-7 | | 100 | ¹2.0 | 20 | $Al_2(SO_4)_3 \cdot 18H_2O$ 3 | 100 | 120 | 13.6 |
| 1-8 | | 100 | ¹2.0 | 20 | $FeSO_4 \cdot 7H_2O$ 3 | 100 | 129 | 15.1 |
| 1-9 | | 100 | ¹2.0 | 20 | $MnSO_4 \cdot 5H_2O$ 3 | 100 | 87 | 15.9 |
| 1-10 | | 100 | ¹2.0 | 20 | $Al(NO_3)_3 \cdot 9H_2O$ 3 | 100 | 130 | 14.6 |
| 1-11 | 100 | | 2.0 | 20 | | 0 | 100 | 102 | 14.5 |
| 1-12 | 100 | | 2.0 | 20 | $AlCl_3$ 3 | 100 | 47 | 17.6 |
| 1-13 | 100 | | 2.0 | 20 | $FeCl_3$ 3 | 100 | 90 | 16.2 |
| 1-14 | 100 | | 2.0 | 20 | $CuCl_2$ 3 | 100 | 8 | 19.0 |
| 1-15 | 100 | | 2.0 | 20 | $MnCl_2$ 3 | 100 | 45 | 16.8 |
| 1-16 | 100 | | 2.0 | 20 | $Al_2(SO_4)_3 \cdot 18H_2O$ 3 | 100 | 50 | 18.1 |
| 1-17 | 100 | | 2.0 | 20 | $FeSO_4 \cdot 7H_2O$ 3 | 100 | 97 | 15.7 |
| 1-18 | 100 | | 2.0 | 20 | $MnSO_4 \cdot 5H_2O$ 3 | 100 | 40 | 20.6 |
| 1-19 | 100 | | 2.0 | 20 | $Al(NO_3)_3 \cdot 9H_2O$ 3 | 100 | 88 | 15.8 |

¹ Controlled by HCl.

As is evident from Table 3, the order of addition of B or C to A does not exert much influence upon the soil stabilizing effect.

Experimental results relating to the influence of the kinds of modified lignin are shown in Table 4.

TABLE 4

| Experiment No. | Mixing ratio (by weight) | | | | | Required gelation time (min.) | Gel strength K-value (kg./cm.³) |
|---|---|---|---|---|---|---|---|
| | A | pH of A | B | C | | Water | | |
| 4-1 | A₁ 100 | 2.0 | 20 | AlCl₃ | 3 | 100 | 47 | 17.6 |
| 4-2 | A₂ 100 | 2.0 | 20 | AlCl₃ | 3 | 100 | 40 | 17.8 |
| 4-3 | A₃ 42 | ¹2.0 | 20 | AlCl₃ | 3 | 158 | 43 | 17.8 |

¹ Controlled by HCl.

(1) From the comparison A₁ with A₂ in Table 4, A₂ from the fermented liquor which has a smaller content of sugar gives a somewhat better result.

(2) The comparison of A₂ with A₃ shows that there is hardly any difference between these two.

Note: Since the solid matter in A₃ in Experimental No. 4-3, is 95 percent, A₃ and water in No. 4-3 are made into 42 parts and 158 parts, respectively so as to set the experimental condition at the same with that of Experiment No. 4-1 and No. 4-2.

The following examples are given to illustrate the present invention without limiting its scope.

The sulfite spent liquor, which was employed in the following examples, is that from Japanese red pine (*Pinus densiflora*) pulp manufacture. However, similar results could be obtained in other cases as compared with the Japanese red pine.

Example 1

To 100 parts by weight of modified lignin liquor (containing 40 percent solid matter) obtained by passing chlorine gas into spent sulfite liquor at 70° C. until the pH reaches to 2, were mixed 20 parts by weight of 40 percent sodium bichromate solution, and 100 parts by weight of water to produce a soil stabilizer.

The resulting soil stabilizer was mixed with loam type soil (containing 36 percent water) in a proportion of 20 percent by weight. The mixture was shaped into a cylindrical form (20 mm. diameter and 50 mm. height) and cured at a temperature of 15° C. for 7 days in a room. The unconfined compression strength of this material was 5.9 kg./cm.²

For control, an unmodified conventional sulfite spent liquor (pH 2 and containing 40 percent solid matter) was employed as above, and the unconfined compression strength of this control sample was 3.8 kg./cm.²

Example 2

To 100 parts by weight of modified lignin liquor (containing 40 percent solid matter) obtained by blowing chlorine gas into spent liquor of sulfite pulp manufacture at room temperature until the pH goes from 5 to 2, were mixed 20 parts by weight of 40 percent sodium bichromate solution, 3 parts by weight of 40 percent aqueous solution of AlCl₃ and 100 parts by weight of water to produce a soil stabilizer.

The resulting soil stabilizer was mixed with loam type soil (containing 36 percent water) in a proportion of 20 percent by weight. The mixture was shaped into a cylindrical form (20 mm. diameter and 50 mm. height) and cured at a temperature of 15° C. for 7 days in a room. The unconfined compression strength of this material was 6.4 kg./cm.³

Example 3

To 100 parts by weight of modified lignin liquor (containing 40 percent solid matter) obtained by blowing chlorine gas into spent liquor from sulfite pulp manufacture at room temperature until the pH goes from 5 to 2, were added 20 parts by weight of 40 percent aqueous solution of sodium bichromate, 3 parts by weight of 40 percent aqueous solution of FeSO₄·7H₂O and 100 parts by weight of water to produce a soil stabilizer.

The resulting soil stabilizer was mixed with loam type soil as in Example 1 and its unconfined compression strength was measured whereby the value of 6.0 kg./cm.² was obtained.

What we claim is:

1. A process for preparing a soil stabilizer which comprises chlorinating a sulfite pulp waste liquor containing lignosulfonic acid until said sulfite pulp waste liquor has a pH of 0.5–4.0 and said lignosulfonic acid has 1.7–2.0% by weight of combined chlorine to modify the sulfite pulp waste liquor and adding to the thusly modified sulfite pulp waste liquor 0.04 to 0.12 part of a compound of hexavalent chromium by weight per part of sulfite pulp waste liquor.

2. A process according to claim 1 wherein the compound of hexavalent chromium is sodium bichromate, the process further comprising adding to the modified sulfite pulp waste liquor a water soluble metallic salt selected from the group consisting of divalent and trivalent metal salts of iron, aluminum, manganese and copper.

3. A process according to claim 1 wherein the sulfite pulp waste liquor is a fermentation waste liquor.

4. A soil stabilizer comprising a modified sulfite pulp lignin mixture consisting essentially of a chlorinated lignosulfonic acid, 0.04 to 0.12 part by weight of a compound of hexavalent chromium per part of modified sulfite pulp liquor per part of modified sulfite pulp lignin.

5. A soil stabilizer according to claim 4 wherein the compound of hexavalent chromium is sodium bichromate and the stabilizer further comprises a water soluble metallic salt selected from the group consisting of divalent and trivalent metal salts of iron, aluminum, manganese and copper.

References Cited

UNITED STATES PATENTS 3,053,675   9/1962   Rehmar et al. _____ 106—123

FOREIGN PATENTS 23,274   10/1930   Australia.

OTHER REFERENCES

Kirk and Othmer: Encyclopedia of Chemical Technology, vol. 9, 1952, p. 333, Interscience, New York.

S. LEON BASHORE, *Acting Primary Examiner.*

DONALL H. SYLVESTER, *Examiner.*

R. BAJEFSKY, *Assistant Examiner.*